United States Patent
Bavouzet et al.

(10) Patent No.: US 8,591,949 B2
(45) Date of Patent: Nov. 26, 2013

(54) AQUEOUS COMPOSITIONS COMPRISING A CHEMICAL MICROGEL ASSOCIATED WITH AN AQUEOUS POLYMER

(75) Inventors: Bruno Bavouzet, Paris (FR); Mathias Destarac, Paris (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 104 days.

(21) Appl. No.: 12/348,745

(22) Filed: Jan. 5, 2009

(65) Prior Publication Data

US 2009/0131578 A1    May 21, 2009

Related U.S. Application Data

(63) Continuation of application No. 10/483,202, filed as application No. PCT/FR02/02512 on Jul. 15, 2002, now abandoned.

(30) Foreign Application Priority Data

Jul. 13, 2001 (FR) ...................................... 01 09387

(51) Int. Cl.
*C08L 31/00* (2006.01)

(52) U.S. Cl.
USPC ........................... 424/484; 424/400; 524/556

(58) Field of Classification Search
USPC ........................................................ 260/29.6
See application file for complete search history.

(56) References Cited

U.S. PATENT DOCUMENTS

| | | | |
|---|---|---|---|
| 4,296,013 A | 10/1981 | Gibbs | |
| 5,112,902 A | 5/1992 | Moriya et al. | |
| 5,994,492 A | 11/1999 | Graham et al. | |
| 6,153,705 A | 11/2000 | Corpart et al. | |
| 6,201,065 B1 * | 3/2001 | Pathak et al. | 525/90 |
| 6,777,513 B1 | 8/2004 | Destarac et al. | |
| 6,809,164 B2 | 10/2004 | Destarac et al. | |
| 7,247,688 B2 | 7/2007 | Destarac et al. | |

FOREIGN PATENT DOCUMENTS

| | | |
|---|---|---|
| DE | 42 06 827 | 9/1992 |
| EP | 0 170 394 | 2/1986 |
| JP | 50127991 | 10/1975 |
| WO | WO 96/30421 | 10/1996 |
| WO | WO 98/01478 | 1/1998 |
| WO | WO 99/03894 | 1/1999 |
| WO | WO 99/31144 | 6/1999 |
| WO | WO 02/26836 | 4/2002 |

OTHER PUBLICATIONS

Otsu, et al; *Role of Initiator-Transfer Agent-Terminator (Iniferter) in Radical Polymerizations: Polymer Design by Organic Disulfides as Iniferters*; Makromol. Chem., Rapid Commun. 3, 127-132(1982); pp. 127-133 (1982).

Matyjaszewski, Krzysztof; *Controlled Radical Polymerizations: The Use of Alkyl Iodides in Degenerative Transfer*; Macromolecules, 1995, 28 (6), 2093-2095; downloaded from : http://pubs.acs.org, Dec. 9, 2008.

Braun, Dietrich; *Invitation of Free Radical Polymerization by Thermal Cleavage of Carbon-Carbon Bonds*; Macromol. Symp.; pp. 111, 63-71 (1996).

Wayland, B. et al; *Living Radical Polymerization of Acrylates by Organcobalt Porphyrin Complexes*; J. Am. Chem. Soc. 1994, 116, pp. 7943-7944.

* cited by examiner

*Primary Examiner* — Walter Webb
(74) *Attorney, Agent, or Firm* — Hunton & Williams LLP

(57) ABSTRACT

The invention concerns an aqueous composition comprising particles of a water-soluble or water-dispersible chemical microgel, associated with at least a water-soluble or water-dispersible crosslinking polymer, differing in composition from the particles; the amount of chemical microgel particles ranging between 0.05 to 40% by dry weight of the composition and the amount of crosslinking polymer being such that the viscosity of the composition is at least three times higher than that of an aqueous solution of chemical microgel particles and than that of an aqueous solution of crosslinking polymer, in similar conditions. The invention also concerns said composition, its use and formulations comprising same.

19 Claims, No Drawings

AQUEOUS COMPOSITIONS COMPRISING A CHEMICAL MICROGEL ASSOCIATED WITH AN AQUEOUS POLYMER

CROSS-REFERENCE TO RELATED APPLICATIONS

This application is a continuation of U.S. application Ser. No. 10/483,202, filed May 24, 2004, now abandoned which is the U.S. National Phase of PCT/FR02/02512 filed Jul. 15, 2002, which claims priority to FR01/09387 filed Jul. 13, 2001.

The present invention relates to aqueous compositions comprising particles of chemical microgel associated with at least one bridging polymer, more particularly in the form of a viscous fluid or a gel.

It also relates to the preparation of said aqueous compositions, to their uses, and formulations comprising them.

Essentially, two types of gel are known: chemical gels and physical gels.

One of the principal advantages of chemical gels resides in the fact that they have a relatively high modulus of elasticity: their behaviour is good when the temperature varies. Further, they may have a weak sensitivity towards the introduction of conventional additives such as bases, acids, surfactants, etc. Such systems, however, are not reversible on shearing, which greatly limits their use. In fact, in current applications, gels used under shear are required to regain their initial viscosity in the absence of the shear. Chemical gels do not possess such characteristics.

This characteristic of at least partial reversibility exists for physical gels. After undergoing shear, they have the capacity of regaining the viscosity of the fluid prior to the shear operation. Further, such gels often have a shear thinning type rheological profile (the viscosity of the gel reduces with increasing shear). The difficulty is that the rheological characteristics of such gels are modified uncontrollably if they are subjected to external variations in temperature and possibly in chemical composition (by adding other compound), etc. Further, such gels are actually viscoelastic fluids which have gel properties over short periods but viscous characteristics over long periods.

One aim of the present invention is to propose a gel which combines the characteristics of stability not only of chemical type gels, but also of physical type gels.

These and other aims are achieved in the present invention, which provides an aqueous composition comprising particles of hydrosoluble or hydrodispersible chemical microgel associated with at least one hydrosoluble or hydrodispersible bridging polymer with a chemical composition that differs from that of said particles; the quantity of chemical microgel particles being in the range 0.05% to 40% of the dry weight of the composition and the quantity of bridging polymer being such that the viscosity of the composition is at least three times, preferably at least ten times that of an aqueous solution of chemical microgel particles and that of an aqueous solution of bridging polymer under the same conditions.

The present invention also relates to a first process for preparing said composition, in which:
a) a chemical gel is prepared in an aqueous phase by polymerizing the desired monomer or monomers and a crosslinking agent, or by chemical post-polymerization cross-linking of a polymer;
b) the resulting gel is ground to obtain chemical microgel particles;
c) said chemical microgel particles are brought into contact with at least one bridging polymer in an aqueous phase.

It concerns a second process for preparing a composition in which the following steps are carried out:
a) preparing particles of chemical microgel by polymerizing the desired monomer or monomers and a cross-linking agent in micro-reactors and/or with stirring and/or in the presence of at least one limiting agent, or by chemical post-polymerization cross-linking, in micro-reactors and/or with stirring, of a polymer;
b) bringing said chemical microgel particles into contact with at least one bridging polymer in an aqueous phase.

The composition of the invention has the advantage of forming a gel which is at least partially or even completely reversible. The rheological profile of the aqueous composition is generally shear thinning in type. Thus, when the composition undergoes shear, the viscosity reduces and increases again or may even resume the initial viscosity when shearing is stopped. In the case in which the rheological profile is shear thickening in nature, reversibility similarly results in the viscosity reducing again or even recover of the initial viscosity when shearing is stopped. Further, the composition of the invention forms a gel which preserves its rheological properties better under constraints of temperature under shear, for example, while conventional physical gels lose them.

It should also be noted, and this constitutes a definite advantage, that depending on the nature of the microgel particles and the bridging polymer, the rheological behaviour of the composition can be adapted as a function of the pH (pH responsive gels).

Other characteristics and advantages of the present invention will become apparent from the following description and examples.

It should be noted that the aqueous composition of the invention can be in the form of a gel. More precisely, the term "gel" means compositions with a modulus of elasticity (G') that is greater than or equal to the loss modulus (G") over a frequency range in the range 1 to 10 Hz, using a cone-plate geometry; the modules were measured in the linear viscoelastic region, at 25° C., with a Rheometrics or Carrimed rheometer.

Further, unless otherwise indicated, the viscosities were measured using a Carrimed type viscosimeter, with a cone-plate geometry; the measurements were made at 25° C. at a shear rate of 1 s$^{-1}$.

Further, the temperature and composition pH conditions given below concern the composition per se prior to use, comprising the copolymer and the charged species, or associated with various other constituents necessary to obtaining complete formulations. These "conditions" can also concern the composition during its use, more specifically during use of the complete formulation.

It should also be pointed out that the term "polymers" designates both homopolymers and copolymers.

The bridging polymer is termed hydrosoluble or hydrodispersible when no macroscopic phase separation phenomena are observed when it is in solution or dispersion in an aqueous phase, after one hour under the same conditions of concentration and temperature as those of the composition of the invention.

Further, the term "particles of hydrosoluble or hydrodispersible chemical microgel" means particles of chemically cross-linked polymer swelled by an aqueous solution.

As indicated above, one of the first constituents of the aqueous composition of the invention is constituted by hydrosoluble or hydrodispersible particles of chemical microgel.

More particularly, the quantity of chemical microgel particles is in the range 0.05% to 10% of the dry composition weight, preferably in the range 0.1% to 5% of the dry composition weight.

In accordance with an advantageous implementation of the invention, the number average size of the chemical microgel particles is in the range 0.3 µm to 10 mm, preferably in the range 1 µm to 1000 µm, more preferably in the range 1 µm to 100 µm.

The number average size is determined by optical microscopy.

Further, the chemical microgel particles are constituted by at least one chemically cross-linked hydrosoluble or hydrodispersible polymer.

Said polymer can be obtained either directly in the cross-linked form, for example by adding at least one cross-linking agent to the monomers constituting the polymer, the cross-linking agent usually being a multifunctional monomer.

Said polymer can also be obtained by carrying out a chemical post-polymerization cross-linking step, i.e., cross-linking after the step for polymerizing the monomer or monomers constituting said polymer.

In an advantageous variation of the present invention, the polymer from which the chemical microgel particles are derived is such that the number of hydrosoluble motifs of said polymer represents at least 50% of the number of polymer motifs, preferably at least 80% by weight of said polymer.

The term "hydrophilic" motif means a monomer selected from those which, once homopolymerized with a degree of polymerization in the range 40 to 100, produces a soluble polymer under the temperature and pH conditions of the composition. More particularly, the temperature is in the range 15° C. to 35° C.

The polymers from which the chemical microgel particles are derived are obtained at least from non ionic, ionic or potentially ionizable (in particular under the pH conditions) hydrophilic monomers.

More particularly, the non ionic hydrophilicity monomers are selected from: ethylene oxide; amides of linear or branched, cyclic or aromatic mono- or polycarboxylic acids, comprising at least one ethylenically unsaturated bond or derivatives thereof, such as (meth)acrylamide, N-methylol (meth)acrylamide; certain esters deriving from (meth)acrylic acid such as 2-hydroxyethyl (meth)acrylate; and vinyl esters that can produce polyvinyl alcohol blocks after hydrolysis, such as vinyl acetate, vinyl Versatate®, vinyl propionate, N-vinylpyrrolidone, used alone or as a mixture.

Regarding ionic or potentially ionic hydrophilic monomers, anionic or potentially anionic monomers can be cited, which carry at least one carboxylic, sulphonic, sulphuric, phosphonic, phosphoric or sulphosuccinic function, their corresponding salts, or their corresponding precursors.

In particular, the polymers can be obtained from at least one monomer selected from:
- a linear or branched, cyclic or aromatic mono- or polycarboxylic acids, N-substituted derivatives of said acids, or monoesters of poly-carboxylic acids, comprising at least one ethylenically unsaturated bond;
- linear or branched, cyclic or aromatic vinyl carboxylic acids;
- aminoacids comprising one or more ethylenically unsaturated bonds;

alone or as a mixture, their sulphonic or phosphonic derivatives, macromonomers deriving from said monomers, or salts or precursors of said monomers. It should be remembered that the term "macromonomer" designates a macromolecule carrying one or more polymerizable functions.

Particular examples of suitable monomers are:
acrylic acid, methacrylic acid, fumaric acid, itaconic acid, citraconic acid, maleic acid, oleic acid, linoleic acid, linolenic acid, acrylamidoglycolic acid, 2-propene-1-sulphonic acid, methallylsulphonic acid, styrenesulphonic acid, α-acrylamidomethylpropanesulphonic acid, 2-sulphoethylene methacrylate, sulphopropylacrylic acid, bis-sulphopropylacrylic acid; bis-sulphopropylmethacrylic acid, sulphatoethyl methacrylic acid, the phosphate monoester of hydroxyethyl methacrylic acid, and their alkali metal salts, such as sodium or potassium salts, or ammonium salts;
vinyl sulphonic acid, vinylbenzene sulphonic acid, vinylphosphonic acid, vinylidene phosphoric acid, vinylbenzoic acid, and their alkali metal salts such as sodium or potassium salts, or ammonium salts;
N-methacryloyl alanine, N-acryloyl-hydroxy-glycine;
alone or as a mixture, as well as macromonomers deriving from said monomers, and the salts or precursors of said monomers.

It should be noted that the scope of the present invention includes the use of monomers that are precursors of those just described. In other words, said monomers have motifs which, once incorporated into the polymer, can be transformed, in particular by a chemical treatment such as hydrolysis, to reproduce the species cited above.

In a second possibility, the ionic or potentially hydrophilic monomers are selected from cationic or potentially cationic monomers.

To this end, in a non-limiting manner, it is possible to employ the following:
aminoalkyl (meth)acrylates, aminoalkyl (meth)acrylamides;
monomers comprising at least one secondary, tertiary or quaternary amine function, or a heterocyclic group containing a nitrogen atom, vinylamine, or ethylene imine;
diallyldialkyl ammonium salts;
alone or as a mixture, as well as macromonomers deriving from said monomers, and salts of said monomers.

Said monomers can have a counter-ion selected from halogens, such as chlorine, sulphates, hydrosulphates, alkylsulphates, phosphates, citrates, formats, or acetates.

Examples of cationic monomers that can form part of the composition of the cationic blocks of the copolymer that can be cited are:
dimethylaminoethyl(meth)acrylate, dimethylaminopropyl (meth)acrylate, ditertiobutyl aminoethyl(meth)acrylate, dimethylamino methyl(meth)acrylamide, dimethylaminopropyl(meth)acrylamide;
ethyleneimine, vinylamine, 2-vinylpyridine, 4-vinylpyridine;
trimethylammonium ethyl(meth)acrylate chloride, trimethylammonium ethyl acrylate methyl sulphate, benzyldimethylammonium ethyl(meth)acrylate chloride, 4-benzoylbenzyl dimethylammonium ethyl acrylate chloride, trimethylammonium ethyl(meth)acrylamido chloride, trimethylammonium vinylbenzyl chloride;
diallyldimethyl ammonium chloride;
used alone or as a mixture, along with macromonomers deriving from said monomers.

The scope of the present invention encompasses the use of one or more amphoteric monomers which, depending on the pH conditions, will provide a net positive, negative or zero charge. Similarly, it is possible to use one or more zwitterionic type monomers, which have a net zero charge at any pH.

Further, the polymers from which the chemical microgel particles are derived can optionally be obtained from hydrophobic monomers.

More particularly, the hydrophobic monomers can be selected from:
propylene oxide, butylene oxide;
esters of linear or branched, cyclic or aromatic mono- or poly-carboxylic acids comprising at least one ethylenically unsaturated bond;
$\alpha\beta$-ethylenically unsaturated nitrites, vinyl ethers, vinyl esters, vinylaromatic monomers, vinyl or vinylidene halides;
linear or branched, aromatic or non aromatic hydrocarbon monomers comprising at least one ethylenically unsaturated bond;
alone or as a mixture, and macromonomers deriving from said monomers.

Particular examples of hydrophobic monomers that can be used in preparing the polymers that can be cited are:
propylene oxide, butylene oxide;
esters of (meth)acrylic acid with an alcohol containing 1 to 12 carbon atoms, such as methyl (meth)acrylate, ethyl (meth)acrylate, propyl (meth)acrylate, n-butyl (meth) acrylate, t-butyl (meth)acrylate, isobutyl (meth)acrylate, 2-ethylhexyl (meth)acrylate;
vinyl acetate, vinyl Versatate®, vinyl propionate, vinyl chloride, vinylidene chloride, methyl vinylether, ethyl vinylether;
vinyl nitrites, more particularly including those containing 3 to 12 carbon atoms, in particular acrylonitrile and methacrylonitrile;
styrene, $\alpha$-methyl styrene, vinyl toluene, butadiene, chloroprene;
alone or as a mixture, and macromonomers deriving from said monomers.

The polymers from which the chemical microgel particles are derived can be homopolymers or copolymers.

Further, they can have any structure. The copolymers may have a random or block structure. Further, whether or not they comprise different monomers, the polymers can be linear, branched, comb-like in structure or star type in structure.

The choice of the nature of the monomers detailed above and their respective proportions can readily be determined by the skilled person to obtain a hydrosoluble or hydrodispersible chemical microgel as a final product.

Production of the chemical microgel particles will now be described.

In a first implementation, the chemical microgel particles are obtained by carrying out the following steps:
a) preparing a chemical gel in an aqueous phase by polymerizing the desired monomer or monomers and a crosslinking agent, or by chemical post-polymerization cross-linking of a polymer;
b) grinding the resulting gel to obtain chemical microgel particles.

Note that the polymers from which the chemical microgel particles are derived are advantageously obtained by using radical polymerization, although other types of polymerization are perfectly possible, such as anionic or cationic polymerization.

It is also possible to employ, depending on the monomers used, group transfer polymerization or ring opening polymerization (especially when polymerizing from a N-carboxy anhydride ring).

Preferably, the polymers are obtained using at least one living radical polymerization step.

Examples of living or controlled polymerization processes that can be referred to are:
the processes described in International applications WO-A-98/58974, WO-A-00/75207 and WO-A-01/42312, which employ radical polymerization controlled by xanthate type control agents;
a radical polymerization process controlled by dithioester type control agents as described in WO-A-98/01478;
the process described in WO-A-99/03894, which employs polymerization in the presence of nitroxide precursors;
the radical polymerization process controlled by control agents of the dithiocarbamate type as described in WO-A-99/31144;
the radical polymerization process controlled by control agents of the dithiocarbazate type as described in WO-A-02/26836;
the radical polymerization process controlled by control agents of the dithiophosphoroester type described in WO-A-02/10223;
the process in application WO-A-96/30421, which employs atom transfer radical polymerization;
the radical polymerization process controlled by Iniferter type control agents as described by Otu et al, Makromol. Chem. Rapid. Commun. 3, 127 (1982);
the radical polymerization process controlled by degenerative iodine transfer, as described by Tatemoto et al, Jap. 50, 127, 991 (1975), Daikin Kogyo Co Ltd Japan and Matyjaszewski et al, Macromolecules, 28, 2093 (1995);
the radical polymerization process controlled by tetraphenylethane derivatives, disclosed by D Braun et al in Macromol. Symp. 111, 63 (1996); or
the radical polymerization process controlled by organocobalt complexes as described by Wayland et al in J. Am. Chem. Soc. 116, 7973 (1994).

Preferably, when the polymers from which the chemical microgel particles are derived have a block structure, the polymerization reaction carried out to obtain them is conducted in the presence of at least one control agent especially of the xanthate, dithiocarbamate or dithioester type.

When the polymers do not have such a structure, conventional radical polymerization is suitable (i.e., without a control agent).

In a first variation of this implementation, the polymer from which the chemical microgel particles are derived is obtained by carrying out polymerization in the aqueous phase of the desired monomers and at least one cross-linking agent. In this case, polymerization and cross-linking are carried out simultaneously.

The monomers listed above when describing the polymers are employed.

The cross-linking monomers that can be used have at least two reactive functions in the selected polymerization mode. In the case of radical polymerization, at least one monomer comprising at least two ethylenically unsaturated bonds and at most 10 unsaturated bonds and known to be radically reactive is used.

Preferably, said monomers have two ethylenically unsaturated bonds. The following can in particular be cited: acrylic, methacrylic, acrylamido, methacrylamido, vinyl ester, vinyl ether, diene, styrene, alpha-methyl styrene and allyl derivatives.

Monomers belonging to those families are: vinyl methacrylate, methacrylic acid anhydride, allyl methacrylate, ethylene glycol dimethacrylate, phenylene dimethacrylate, diethylene glycol dimethacrylate, triethylene glycol dimethacrylate, tetraethylene glycol dimethacrylate, polyethylene 200 dimethacylate, polyethylene glycol 400 dimethacylate, butanediol 1,3-dimethacrylate, butanediol 1,4-dimethacrylate, hexanediol 1,6-dimethacrylate, dodecanediol 1,12-dimethacrylate, glycerol 1,3-dimethacrylate, diurethane dimethacrylate, trimethylolpropane trimethacrylate. Particular members of the multifunctional acrylate family that can be cited are vinyl acrylate, bisphenol A epoxy diacrylate, dipropylene glycol diacrylate, tripropyleneglycol diacrylate, polyethylene glycol 600 diacrylate, ethylene glycol diacrylate, diethylene glycol diacrylate, triethylene glycol diacrylate, tetraethylene glycol diacrylate, ethoxylated neopentyl glycol diacrylate, butanediol diacrylate, hexanediol diacrylate, aliphatic urethane diacrylate, trimethylolpropane triacrylate, ethoxylated trimethylolpropane triacrylate, propoxylated trimethylolpropane triacrylate, propoxylated glycerol triacrylate, aliphatic urethane triacrylate, trimethylolpropane tetraacrylate, dipentaerythritol pentaacrylate. Vinyl ethers that can be cited are vinyl crotonate, diethylene glycol divinyl ether, 1,4-butanediol divinyl ether, triethylene glycol divinyl ether. The following allyl derivatives can be cited: diallyl phthalate, diallyldimethyl ammonium chloride, diallyl malleate, sodium diallyloxyacetate, diallylphenylphosphine, diallylpyrocarbonate, diallyl succinate, N,N'-diallyltartardiamide, N,N-diallyl-2,2,2-trifluoroacetamide, the allyl ester of diallyloxyacetic acid, 1,3-diallyl urea, triallylamine, triallyl trimesate, triallyl cyanurate, triallyl trimellitate, triallyl-1,3,5-triazine-2,4,6-(1H,3H,5H)-trione. Acrylamido derivatives that can in particular be cited are N,N'methylenebisacrylamide, N,N'-methylenebismethacrylamide, glyoxal bisacrylamide, diacrylamdoacetic acid. Styrene derivatives that can be cited include divinylbenzene and 1,3-diisopropenylbenzene. Diene monomers that can be cited are butadiene, chloroprene and isoprene.

Preferred cross-linking monomers are N,N'-methylenebisacrylamide, divinylbenzene and ethylene glycol diacrylate.

Further, the quantity of cross-linking agent can readily be determined by the skilled person depending on the desired degree of cross-linking and such that the chemical microgel particles to be obtained finally are hydrosoluble or hydrodispersible, as defined above.

The polymerization reaction is carried out in the presence of at least one source of free radicals. This radical polymerization initiator can be selected from initiators conventionally used in radical polymerization, such as:

peroxides of hydrogen, such as tertiary butyl hydroperoxide, cumene hydroperoxide, t-butyl-peroxyacetate, t-butyl-peroxybenzoate, t-butylperoxyoctoate, t-butylperoxyneodecanoate, t-butylperoxyisobutarate, lauroyl peroxide, t-amylperoxypival, t-butylperoxypivalate, dicumyl peroxide, benzoyl peroxide, potassium persulphate and ammonium persulphate;

azo compounds, such as: 2,2-azobis(isobutyronitrile), 2,2'-azobis(2-butanenitrile), 4,4'-azobis(4-pentanoic acid), 1,1'-azobis(cyclohexane-carbonitrile), 2-(t-butylazo)-2-cyanopropane, 2,2-azobis[2-methyl-N-(1,1)-bis(hydroxymethyl)-2-hydroxyethyl]propionamide, 2,2'-azobis[2-methyl-N-hydroxyethyl]-propionamide, 2,2'-azobis(N,N'-dimethylene isobutyramidine)dichloride, 2,2'-azobis(2-amidinopropane)dichloride, 2,2'-azobis(N,N'dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide)dihydrate;

redox systems comprising combinations such as mixtures of peroxides of hydrogen, and analogues with one or more iron salts, titanous salts, etc, and reducing sugars; alkali metal or ammonium persulphates, perborates or perchlorates in association with an alkali metal bisulphite and reducing sugars; alkali metal persulphate in association with an arylphosphinic acid and reducing sugars.

Normally, the quantity of initiator to be used is determined so that the quantity of radicals created is at most 50 mole %, preferably at most 20 mole % with respect to the quantity of polymer or control agent.

The temperature can be between ambient temperature and 150° C., depending on the nature of the monomers used.

Polymerization is advantageously carried out in solution in water.

In a second variation of this first implementation, the polymer from which the chemical microgel particles is derived is prepared by carrying out aqueous phase polymerization of the desired monomer or monomers followed by a step for cross-linking said polymer (post-polymerization cross-linking).

The cross-linking agents cited above can be used during this step.

The conditions for carrying out the cross-linking are of the same type as those for the polymerization reaction, with the exception that no control agent is introduced.

Thus, cross-linking is carried out in the presence of at least one initiator, in an amount such that the quantity of radicals created is at most 50 mole %, preferably at most 20 mole % with respect to the quantity of polymer.

It should be noted that depending on the nature of the monomers forming the polymer, cross-linking can consist of reacting the polymer functions together. As an example, it may concern esterification or transesterification reactions.

In this case, catalysts that are particular to those reactions, such as acids or bases, can be added to the polymer.

In a further possibility, polymer cross-linking can be carried out using multifunctional non-polymerizable compounds carrying at least one chemical function that is an antagonist to that/those carried by the polymer to be cross-linked. As an example, it is possible to use a di-iodine compound to cross-link a polymer carrying at least one poly(2-dimethylaminoethyl acrylate) block, or glutaraldehyde to cross-link a polyvinyl type alcohol, etc.

The polymer is separated from the reaction mixture in conventional manner, for example by precipitation from a non-solvent.

Once the chemically cross-linked polymer has been obtained, the latter is ground.

This operation is carried out conventionally. Conventional mills can be used, and also ultrasound.

It is generally carried out with a polymer dispersed in a non-solvent. This operation is carried out for a period that is sufficient to obtain a number average particle size in the range 0.3 µm to 10 mm, preferably in the range 1 µm to 1000 µm, more preferably in the range 1 µm to 100 µm.

In a second implementation, the chemical microgel particles are obtained by carrying out polymerization of the desired monomers and the cross-linking agent in micro-reactors and/or with stirring and/or in the presence of at least one limiting agent, or by chemical post-polymerization cross-linking in micro-reactors and/or with stirring, of a polymer obtained by polymerization of the desired monomers or monomers.

It should be noted that said polymer from which the chemical microgel particles are derived may or may not be obtained by carrying out the polymerization in micro-reactors and/or with stirring.

The information given above regarding the nature of the monomers, the cross-linking agents and the presence or absence of the control agent is also valid as regards this second implementation: the difference is essentially the manner in which the polymerization and possibly cross-linking reactions are carried out.

Regarding the limiting agent, this latter can be selected from radical transfer agents, for example compounds of the thiol type (see Sherrington, Polymer 41 (2000)) or from control agents, for example of the nitroxide type (see D H Solomon et al, Macromol. Rapid Commun. 18, 755 (1997) and Polymer 42, 5987 (2001)). Using such agents prevents macrogel formation.

This second implementation aims to provide access to chemical microgel particles without having to carry out a polymer grinding step. To achieve this, polymerization is carried out in micro-reactors either with stirring or in the presence of a limiting agent, or by a combination of these possibilities.

More particularly, micro-reactors are droplets of an emulsion, which in the present case is a reverse emulsion (water-in-oil).

The skilled person can readily carry out emulsion polymerization reactions.

More particularly, the organic phase is composed of an organic solvent that is not miscible with water and is inert under the reaction conditions. Examples that can be cited are hexane, heptane, isoparaffin cuts, etc.

Further, the organic phase of the emulsion further comprises at least one surfactant.

Preferably, the surfactant is selected from those that are at least partially soluble in the organic phase of the emulsion.

Advantageously, particular surfactants that can be employed in this implementation are selected from non ionic surfactants with a low HLB (more particularly 8 or less).

The following are suitable: alkoxylated fatty alcohols, alkoxylated triglycerides, alkoxylated fatty acids, sorbitan esters, which may have been alkoxylated, alkoxylated fatty amines; the number of alkoxylated motifs (oxyethylenated, oxypropylenated, oxybutylenated) is such that the HLB is 8 or less.

It should be noted that the polymerization reaction can also be carried out using an amphiphilic polymer to stabilize the reverse emulsion, used alone or as a mixture with one or more of said surfactants.

Examples of said polymers that can be cited are polyhydroxystearate triblock polymers-polyethylene glycol-polyhydroxystearate (products from ICI's Arlacel range, for example).

In a particularly advantageous implementation, the reverse emulsion comprises an amphiphilic polymer or a mixture of a plurality thereof.

The total quantity of surfactant and/or amphiphilic polymer preferably represents 2% to 10% of the oily phase weight.

When polymerization is carried out with stirring, the latter must be sufficient to shear the reaction mixture and ensure that the polymer obtained is of appropriate size.

It should be noted that a combination of these two possibilities is possible.

Finally, the scope of the present invention encompasses carrying out a grinding step on the particles obtained at the end of said steps.

The second constituent of the composition of the invention is the bridging polymer. This is a hydrosoluble or hydrodispersible polymer with a chemical nature that differs from that of the chemical microgel particles described above.

It should be noted that the bridging polymer is considered to have a different chemical composition (nature) from that of the microgel particles if the overall compositions of the polymers are different either as regards the nature of the repeating units or the respective proportions of the repeating units.

Further, the bridging polymer and the chemical microgel particles are associated in an at least partially reversible manner. In fact, the composition comprising the bridging polymer and the microgel particles has rheological characteristics such that the difference between the initial viscosity and the viscosity after shear treatment for 5 minutes at $100\ s^{-1}$ measured after leaving for 24 hours is 50% or less, preferably 20% or less of the initial viscosity.

As indicated above, the quantity of bridging polymer is such that the viscosity of the composition is at least three times that of an aqueous solution of chemical microgel particles and that of an aqueous solution of the bridging polymer under the same conditions (concentration, temperature). Preferably, the viscosity of the composition is at least ten times that of an aqueous solution of chemical microgel particles and that of an aqueous solution of bridging polymer under the same conditions.

More particularly, the bridging polymer is constituted by at least one polymer with a mass average molar mass that is in the range $10^3$ to $5 \times 10^7$ g/mol, more particularly in the range $10^4$ to $10^7$ g/mol, preferably in the range $5 \times 10^5$ to $5 \times 10^6$ g/mol. Said mass average molar masses are determined using the MALLS (multi-angle light scattering) method coupled with gel permeation chromatography.

In accordance with a preferred characteristic of the invention, the bridging polymer used has a linear structure, optionally comprising pendent side chains (grafts).

In a first variation of the invention, the bridging polymer is obtained at least starting from non ionic, ionic or potentially ionizable and optionally hydrophobic monomers.

Regarding the hydrophilic and hydrophobic monomers mentioned above, reference can be made to the lists relating to each of said monomers, given as part of the description regarding the polymers from which chemical microgel particles can be obtained.

Reference can also be made to the various methods for preparing the polymers, with the exception that the bridging polymers are not cross-linked species. Preferably, the cross-linking agent is employed during or after producing said polymers.

The choice of bridging polymer is made as a function of the nature of the cross-linked polymer constituting the chemical microgel particles, in order to produce interactions between the two compounds, namely the bridging polymer and the chemical microgel particles.

As an example, when the chemical microgel particles and the bridging polymer are to be associated by means of electrostatic type interactions, the latter are selected so that the net overall charge of the chemical microgel particles is opposite to that of the net overall charge of the bridging polymer. More precisely, when the chemical microgel particles include anionic motifs, the bridging polymer is selected so that certain of its repeating units include cationic or potentially cationic charges (for example under the pH use conditions of the composition).

Advantageously, the bridging polymer is such that it has a degree of charged monomer polymerization in the range 5 to 10.

Preferably, in the case of this type of interaction, at least 50 number %, preferably at least 80 number % of the monomers constituting the polymeric chain of the bridging polymer and the chemical microgel particles have no ionic charge.

In a further possibility, the chemical microgel particles and the bridging polymer are associated by means of hydrophobic-hydrophobic type interactions. In this case, the microgel particles and the bridging polymer comprise motifs that can associate together in the aqueous phase by means of said bonds.

An example of said type of interaction that can be cited is the association of microgel particles comprising long alkyl chains (for example $C_8$ to $C_{22}$ or more) with a $C_6$ to $C_{22}$ alkyl acrylate type bridging polymer.

In a final possibility, the chemical microgel particles and the bridging polymer are associated by means of hydrogen bond type interactions. In this variation, the chemical microgel particles and the bridging polymer comprise motifs that can associate together in an aqueous phase via such bonds (for example, carboxylic and/or amide motifs and ether and/or alcohol and/or amine motifs).

In this case, the bridging polymer and the chemical microgel particles comprise carboxylic acid, alcohol, ether, or amide type functions, for example.

In a second variations of the invention, the bridging polymer comprises at least one polymer selected from biopolymers that may or may not have been chemically modified.

In this variation, the biopolymers are selected from polysaccharides such as galactomannans, glucomannans, succinoglycans, xanthan gum, cellulose, alginates, gelatin, which may or may not have been chemically modified.

The choice of biopolymer (non ionic, hydrophobic, anionic, cationic, . . . ) will be made as a function of the nature of the chemical microgel particles, in order to obtain interactions between the particles and the bridging polymer of the type listed above, namely electrostatic interactions, hydrophobic-hydrophobic interactions, or hydrogen bonds.

The composition of the invention can be obtained by carrying out the following steps:
 a) preparing a chemical gel in an aqueous phase by polymerizing the desired monomer or monomers and a crosslinking agent, or by chemical post-polymerization cross-linking of a polymer;
 b) grinding the resulting gel to obtain chemical microgel particles;
 c) bringing said chemical microgel particles into contact with at least one bridging polymer in an aqueous phase.

In a further variation, the composition is obtained by carrying out the following steps:
 a) preparing particles of chemical microgel by polymerizing the desired monomer or monomers and a cross-linking agent in micro-reactors and/or with stirring and/or in the presence of at least one limiting agent, or by chemical post-polymerization cross-linking of a polymer in micro-reactors and/or with stirring;
 b) bringing said chemical microgel particles into contact with at least one bridging polymer in an aqueous phase.

For each of these two possibilities, the first two steps have already been described above in the context of the polymers from which the chemical microgel particles are obtained.

The last step is carried out simply by mixing the bridging polymer and the chemical microgel particles.

The invention also concerns the use of the composition described above in the fields of oil or gas field working, detergents, cosmetics, and metal treatment (transformation, deformation).

In a final aspect, the invention concerns formulations comprising said composition; the formulations being intended for the fields of oil or gas field working, detergents or cosmetics.

Non limiting examples of the invention will now be given.

EXAMPLE 1

Synthesis of PAA/PHEA Microgel

Step 1: Synthesis of a PAA-b-PHEA Block Copolymer (polyacrylic acid-b-polyhydroxyethyl acrylate) 5000-b-30000

Synthesis of First Block 30 g of acrylic acid (AA), 1.255 g of O-ethyl-S-(1-methoxycarbonyl)ethylenyl)xanthate $(CH_3CHCO_2CH_3)S(C=S)$ OEt, 0.147 g of AIBN and 125 ml of acetone were placed in a three-necked flask provided with a coolant, a magnetic stirrer and a heating bath. The medium was heated to 70° C. for 20 h. The solvent was evaporated off under vacuum and vacuum dried to constant mass.

The number average molar mass (Mn) was measured by steric exclusion chromatography (CES) using linear PAA standards for the calibration.

Mn=4300 g/mol

Synthesis of Diblock 10 g of polyacrylic acid (PAA) with a xanthate terminus described above, 74 g of distilled water and 148 g of acetone were placed in a three-necked flask provided with a coolant, a magnetic stirrer and a heating bath.

The medium was heated to 70° C. over 30 minutes.

At 70° C., 69.8 g of hydroxyethyl acrylate (HEA was continuously added over 2 h 45 and 0.076 g of azoisobutyronitrile (AIBN) was added in one shot. Two portions of AIBN each of 0.076 g was added two hours and four hours after starting to introduce the monomer. Heating and stirring were maintained for 16 h.

The final dry extract was 26.4% by weight.

Step 2: Cross-Linking of Block Copolymer

The above solution of copolymer was left in the oven at 40° C. for 30 days. Light diffusion then conventional microscopy were used to monitor the appearance of the microgels.

Production of GEL

An aqueous solution A containing 3.2% by weight of the above microgel was prepared at a pH of 7 (adjustment using an aqueous solution of molar sodium hydroxide).

An aqueous solution B was prepared containing 0.82% of a cationic polymer, Glokill PQ (sold by RHODIA CHIMIE). Solution B was also brought to a pH of 7 using sodium hydroxide.

The aqueous formulation C was then prepared by mixing an identical mass of A and B.

Formulae A' and B' were also prepared by respectively diluting solutions A and B with water, twice (pH constant=7).

| Formulations | Viscosity* (Pa · s) |
|---|---|
| A' | <0.0 |
| B' | <0.1 |
| C | 10 |

*viscosity measured using a Carrimed type viscosimeter with a cone-plate geometry; the measurements were made at 25° C. at a shear rate of 1 $s^{-1}$.

EXAMPLE 2

Synthesis of PAA/Pam Microgel

Step 1: Synthesis of a PAA-b-Pam Block Copolymer (polyacrylic acid-b-polyacrylamide) 5000-b-60000

Synthesis of First Block 7.7 g of acrylic acid (AA), 0.32 g of O-ethyl-S-(1-methoxycarbonyl)ethylenyl)xanthate $(CH_3CHCO_2CH_3)S(C=S)$ OEt, 0.22 g of 4,4'-azobis(4-cyanovaleric acid), 2.5 g of isopropanol and 16.7 g of water were placed in a three-necked flask provided with a coolant, a magnetic stirrer and a heating bath. The medium was limited to 70° C. for 6 h.

A sample was removed and the number average molar mass (Mn) was measured by steric exclusion chromatography (CES) using linear PAA standards for the calibration.

Mn=4500 g/mol

Synthesis of Diblock 92.3 g of acrylamide, 0.21 g of 4,4'-azobis(4-cyanovaleric acid) and 215.8 g of water were added to the polymer from step 1, kept at 70° C. The mixture was heated for 6 hours.

A sample was removed and its mass average molecular mass (Mn) was measured: Mn=49000.

Step 2: Synthesis of Microgel Based on PAA and Pam 10 g of diblock copolymer from step 1 was diluted to 12% in water. 1.18 g of N,N-methylenebis acrylamide and 20 mg of 4,4'-azobis(4-cyanovaleric acid) were then added to the diblock solution. The mixture was then heated to 70° C. for 5 hours.

The prepared product formed a clear solution in water. It could not be filtered using a 0.45 μm GPC filter, proof of the formation of a microgel Production of GEL An aqueous solution A containing 6% by weight of the above microgel was prepared at a pH of 7 (adjustment using an aqueous solution of molar sodium hydroxide).

An aqueous solution B was prepared containing 1.6% of a cationic polymer, Glokill PQ (sold by RHODIA CHIMIE). Solution B was also brought to a pH of 7 using sodium hydroxide.

The aqueous formulation C was then prepared by mixing an identical mass of A and B.

Formulae A' and B' were also prepared by respectively diluting solutions A and B with water, twice (pH constant=7).

| Formulations | Viscosity* (Pa · s) |
|---|---|
| A' | <3 |
| B' | <1 |
| C | >10 |

*viscosity measured using a Carrimed type viscosimeter with a cone-plate geometry; the measurements were made at 25° C. at a shear rate of $1 \ s^{-1}$.

The invention claimed is:

1. An aqueous composition comprising particles of chemically crosslinked hydrosoluble or hydrodispersible chemical microgel wherein said particles of microgel are at least partially reversibly associated with at least one hydrosoluble or hydrodispersible bridging polymer, said polymer comprising a chemical composition that differs from that of said particles; the chemical microgel particles ranging in a quantity from 0.05% to 40% of the dry weight of the composition; the composition having a viscosity of at least three times that of an aqueous solution of chemical microgel particles without the bridging polymer, and three times that of an aqueous solution of bridging polymer without the chemical microgel particles under the same conditions; wherein the bridging polymer includes a number of hydrosoluble motifs representing at least 50% of the number of motifs of the polymer; and further wherein the chemical microgel particles and the bridging polymer include monomers comprising hydrophilic, non-ionic, ionic or potentially ionic, optionally hydrophobic monomers, or combinations thereof.

2. The composition of claim 1, wherein the chemical microgel particles range in quantity from 0.05% to 10% of the weight of the dry composition.

3. The composition of claim 1, wherein the chemical microgel particles have a number average size ranging from 0.3 μm to 10 mm.

4. The composition of claim 1, wherein the bridging polymer comprises at least one polymer having a theoretical molar mass ranging from $10^3$ to $5 \times 10^7$ g/mol by weight.

5. The composition of claim 1, wherein the hydrophilic non-ionic monomers comprise ethylene oxide; amides of linear or branched, cyclic or aromatic mono- or polycarboxylic acids, comprising at least one ethylenically unsaturated bond; 2-hydroxyethyl (meth)acrylate; or vinyl esters producing polyvinyl alcohol blocks after hydrolysis.

6. The composition of claim 1, wherein the ionic or potentially ionic hydrophilic monomers comprise anionic or potentially anionic monomers carrying at least one carboxylic, sulfonic, sulfuric, phosphonic, phosphoric or sulfosuccinic function.

7. The composition of claim 5, wherein the anionic or potentially anionic monomers comprise:

linear or branched, cyclic or aromatic mono- or poly-carboxylic acids, N-substituted derivatives of said acids, or monoesters of poly-carboxylic acids, comprising at least one ethylenically unsaturated bond;

linear or branched, cyclic or aromatic vinyl carboxylic acids; or amino acids comprising one or more ethylenically unsaturated bonds.

8. The composition of claim 1, wherein the ionic or potentially ionic hydrophilic monomers comprise cationic or potentially cationic monomers comprising:

aminoalkyl (meth)acrylates, aminoalkyl (meth)acrylamides;

monomers comprising at least one secondary, tertiary or quaternary amine function, or a heterocyclic group comprising a nitrogen atom, vinylamine, or ethylene imine; or diallyldialkyl ammonium salts.

9. The composition of claim 5, wherein the ionic or potentially ionic hydrophilic monomers further comprise one or more amphoteric and/or zwitterionic monomers.

10. The composition of claim 1, wherein the hydrophobic monomers comprise:

propylene oxide, butylene oxide;

esters of linear or branched, cyclic or aromatic mono- or poly-carboxylic acids comprising at least one ethylenically unsaturated bond;

αβ ethylenically unsaturated nitriles, vinyl ethers, vinyl esters, vinylaromatic monomers, vinyl or vinylidene halides; or linear or branched, aromatic or non aromatic hydrocarbon monomers comprising at least one ethylenically unsaturated bond.

11. The composition of claim 1, wherein the bridging polymer comprises at least one polymer selected from chemically modified or non-modified biopolymers.

12. The composition of claim 11, wherein the biopolymers are galactomannans, glucoomannans, succinoglycans, xanthan gum, cellulose, alginates or gelatin.

13. The composition of claim 1, wherein the chemical microgel particles and the bridging polymer are further associated by electrostatic interactions;
further wherein the chemical microgel particles have an overall charge opposite to the overall charge of the bridging polymer.

14. The composition of claim 1, wherein the chemical microgel particles and the bridging polymer are associated by hydrophobic-hydrophobic type interactions; and
wherein the chemical microgel particles and the bridging polymer comprise motifs associated in an aqueous phase through said interactions.

15. The composition of claim 1, wherein the chemical microgel particles and the bridging polymer are associated by hydrogen bond interactions; and
wherein the chemical microgel particles and the bridging polymer comprise motifs associated in an aqueous phase through said bonds.

16. A process for preparation of the composition of claim 1, comprising:

a) preparing a chemical gel in an aqueous phase by polymerizing the desired monomer or monomers and a crosslinking agent, or by chemical post-polymerization cross-linking of a polymer;
b) grinding the resulting gel to obtain chemical microgel particles; and
c) bringing said chemical microgel particles into contact with at least one bridging polymer in an aqueous phase.

17. A process for preparation of the composition of claim 1, comprising:
a) preparing particles of the chemical microgel by polymerizing the monomers and a cross-linking agent in a micro-reactor and/or with stirring and/or in the presence of at least one limiting agent, or by chemical post-polymerization cross-linking of a polymer in a micro-reactor and/or with stirring; and
b) bringing said chemical microgel particles into contact with at least one bridging polymer in an aqueous phase.

18. The composition of claim 1, wherein the association of the chemical microgel particles with the bridging polymer is completely reversible.

19. The composition of claim 1, wherein the chemical microgel particles are associated with the bridging polymer by an electrostatic-type interaction, a hydrophobic-hydrophobic-type interaction, a hydrogen bond-type interaction, or a combination thereof.

* * * * *